INVENTORS.
LEWIS W. JACOBS,
ROBERT J. SABATELLA
BY Robert L. Casey
ATTORNEY

Dec. 24, 1968  L. W. JACOBS ET AL  3,418,536
MAIN CIRCUIT BREAKER ASSEMBLY FOR ELECTRICAL CIRCUIT
CONTROL DEVICE PANELBOARDS AND
ADAPTER BASE THEREFOR
Filed June 23, 1967  2 Sheets-Sheet 2
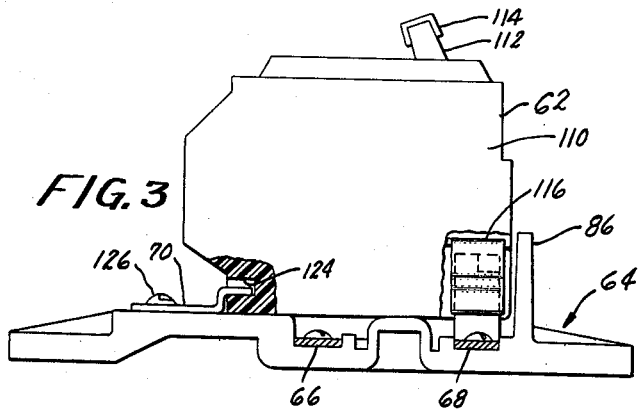
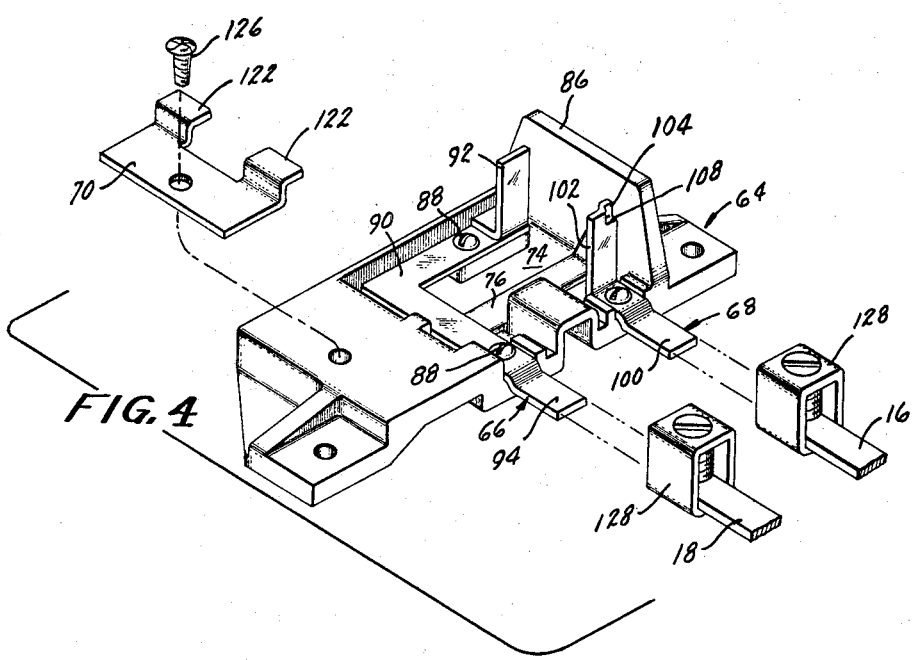
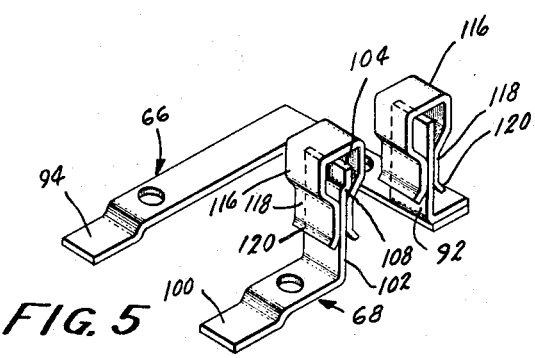
INVENTORS.
LEWIS W. JACOBS,
ROBERT J. SABATELLA
BY Robert H. Casey
ATTORNEY

United States Patent Office 3,418,536
Patented Dec. 24, 1968

3,418,536
MAIN CIRCUIT BREAKER ASSEMBLY FOR ELECTRICAL CIRCUIT CONTROL DEVICE PANELBOARDS AND ADAPTER BASE THEREFOR
Lewis W. Jacobs, Garden City, N.Y., and Robert J. Sabatella, Southington, Conn., assignors to General Electric Company, a corporation of New York
Filed June 23, 1967, Ser. No. 648,452
16 Claims. (Cl. 317—119)

ABSTRACT OF THE DISCLOSURE

There is disclosed a main circuit breaker assembly for mounting on electrical circuit control device panelboards utilizing a pair of generally conventional electric circuit control devices which have contact jaws adjacent the lower front edge thereof extending parallel to the longitudinal axis of the housing which is also provided with a shoulder on the rear surface thereof. An insulating support has a pair of conductor elements mounted thereon which are adapted to be electrically engaged with a pair of conductors in the panelboard. The conductor elements have upstanding parallel contact blade portions clampingly engaged by the contact jaws of the pair of control devices and one of the blade portions has an upper edge portion extending laterally from the plane of the body portion thereof to provide a shoulder. The cooperating control device has its contact jaws dimensioned and configured to permit sliding movement along its longitudinal axis about the contact blade upper edge portion and into clamping engagement with the body portion below the shoulder. However, the contact jaws are prevented from expansion sufficiently to permit disengagement from the shoulder by pivoting of the front ends of the control device upwardly about its rear edge. Retaining means are provided on the insulating support which are engaged with the shoulders on the rear surface of the control devices to prevent substantially sliding movement thereof away from the contact blade portion thereby to maintain the elements in assembly.

To prevent inadvertent contact with the contact blade portions and the contact jaws of the control devices, the insulating support is provided with an upstanding wall portion extending across the front surfaces of the control devices and providing a barrier therefor. In a preferred assembly, the conductor elements have terminal portions extending outwardly from the insulating support which are clampingly engaged with a pair of conductors of the panelboard and means are provided for mounting the insulating support to the base of the panelboard.

Background of the invention

The present invention relates to electrical circuit control device panelboard assemblies or load centers and, more particularly, to an adapter base for a main circuit breaker assembly which may be mounted in a panelboard so as to provide main circuit control.

Panelboards or load centers are commonly employed to distribute electrical energy to a plurality of circuits through electrical circuit control devices intended to break the circuit to prevent an overload or a short circuit. In addition to breaking the individual circuits of the panelboard, it is highly desirable to provide circuit control means for interrupting all of the circuits of the panelboards simultaneously. Various types of main circuit breakers have been proposed and are widely utilized and some load centers incorporate special arrangements providing main circuit breaker control.

It is an object of the present invention to provide a main circuit breaker assembly which may be readily mounted in a conventional load center either in the factory or in the field with relative ease to provide a desirably safe and highly effective panelboard assembly.

It is also an object to provide such a main circuit breaker assembly utilizing circuit breakers of generally conventional construction with means for preventing unauthorized disengagement of the circuit breakers and for protecting the current-carrying portions thereof from inadvertent contact.

Another object is to provide an adapter base for utilization with circuit breakers of generally convention construction to effect mounting thereof in the saddle or base of a conventional load center to provide main circuit breaker control for the currrent supply to the load center.

Still another object is to provide such an adapter base and main circuit breaker assembly utilizing a novel but simple construction for the contact blades to facilitate assembly with circuit breakers of conventional construction but to minimize the opportunity for inadvertent or unauthorized disengagement thereof.

Summary of the invention

It has now been found that the foregoing and related objects can be readily attained in a main circuit breaker assembly for mounting in an electrical circuit control device panelboard which utilizes a pair of electrical circuit control devices having contact jaws adjacent the lower front edge thereof extending parallel to the longitudinal axis of the housing and a shoulder on the rear surface of the housing. An insulating support has mounted thereon a pair of conductor elements which are adapted to be electrically engaged with a pair of conductors in the panelboard. The conductors have upstanding parallel contact blade portions which are clampingly engaged by the contact jaws of the pair of control devices and one of the contact blade portions has an upper edge portion extending laterally from the plane of the body portion thereof to provide a shoulder. The cooperating control device has its contact jaws dimensioned and configured to permit sliding movement along the longitudinal axis of the housing about the contact blade upper edge portion and into clamping engagement with the body portion below the shoulder. However, the contact jaws are prevented from expansion sufficiently to permit disengagement from the shoulder by pivoting of the control device about its rear edge so as to attempt to lift the front edge upwardly from the insulating support. Retaining means are provided on the insulating support which engage with the shoulders on the rear surfaces of the control devices to prevent substantial sliding movement thereof away from the contact blade portions.

In utilization of the main circuit breaker assembly, the insulating support is mounted on the base or saddle of the panelboard and its conductor elements are electrically coupled to the conductors or busbars of the load center. In its preferred aspect, the conductor elements have portions extending outwardly from the insulating support to provide terminals which may be clampingly engaged with the ends of the busbars of the panelboard. Since the main circuit breaker assemblies of the present invention are relatively compact, they may be installed in many existing panelboard housings.

The electrical circuit control devices of the circuit breakers useful in the present invention may be those conventionally employed since the adapter base provides the means for maintaining the circuit breakers in assembly and protecting the user from inadvertent contact with the load carrying contact jaws and contact blades. Generally such control devices have molded housings of insulating material with contact jaws of generally U-shaped configuration having inwardly offset portions adjacent the free ends thereof to provide enhanced clamping engagement. By properly dimensioning the laterally extending upper edge portion on the contact blade, the recess in the housing which received the contact jaws will normally provide the means for preventing the expansion necessary for the contact jaws to clear the shoulder. Alternatively, separate elements may be incorporated with the circuit breaker housing to restrict the expansion of the contact jaws such as, for example, a tie about the legs or between the legs of the contact. The shoulder on the housing for engagement with the retaining means of the adapter base can be provided by a conventional recess formed in the lower rear edge thereof or by projecting portion.

The insulating support is most desirably molded so as to minimize the amount of material required and to provide structural features particularly adapted to the present invention. Desirably it is an elongated structure having the means for mounting it upon the base or saddle of the panelboard adjacent the ends thereof, most conveniently in the form of apertures to receive threaded fasteners. Adjacent one end, the insulating support is provided with an upstanding wall which will function as a barrier to prevent inadvertent contact with the contact blade portions and contact jaws. Most desirably, it is configured so as to provide a recess to receive the conductor elements and thus provide a relatively firm support for the bottom surface of the control devices mounted thereon.

The conductor elements are normally provided by flat members which may be sheet stock or cast elements and the upstanding contact blade portions may be provided by bending the conductor elements or by brazing, soldering, or otherwise joining separate pieces of metal to provide the desired configuration for the conductor elements. The laterally extending edge portion may be cast or rolled into the contact blade portion or it may be provided as a separate piece of metal brazed or otherwise affixed thereto. Most conveniently, it is formed by subjecting the end portion to deformation sufficiently to provide an offset of the desired width for the shoulder. It will be appreciated that the laterally extending portion and shoulder need not extend for the whole length of the upper edge portion but may comprise only a fraction of the length so that the contact jaws may slide forward under the shoulder which will maintain the jaws in engagement therewith. The retaining means should also include some form of fastener coupling it to the insulating support and which is not readily adapted to be disengaged by an unauthorized person. One-way screws or fasteners having special head designs requiring tools possessed only by authorized servicemen are highly useful in this regard.

It can be seen that the present invention thus provides a simple and highly effective adapter which may utilize conventional circuit breakers to provide main circuit breaker control for a panelboard or load center. If desired, the insulating support may have a plurality of apertures spaced about the end portions thereof to permit mounting upon saddles or base members of panel boards of various sizes. It can be seen that the adapter is also suitable for mounting upon a separate portion of the load center housing should this be necessary.

Because of the simplicity of assembly provided by the adapter unit, load centers may be converted in the field or they may be preassembled at the factory to include main circuit breaker control. The utilization of conventional circuit breaker construction minimizes the cost of the assembly and also the problems in effecting replacement.

Brief description of the drawings

FIGURE 3 is a fragmentary sectional view of the panelboard assembly along the line 3—3 in FIGURE 1 with portions of the circuit breaker broken away for clarity of illustration;

FIGURE 4 is a perspective view of the insulating support of FIGURE 1; and

FIGURE 5 is a fragmentary exploded perspective view of the insulating support-conductor elements subassembly and contact jaws of the main circuit control devices.

Detailed description of the illustrated embodiments

Figure 1:
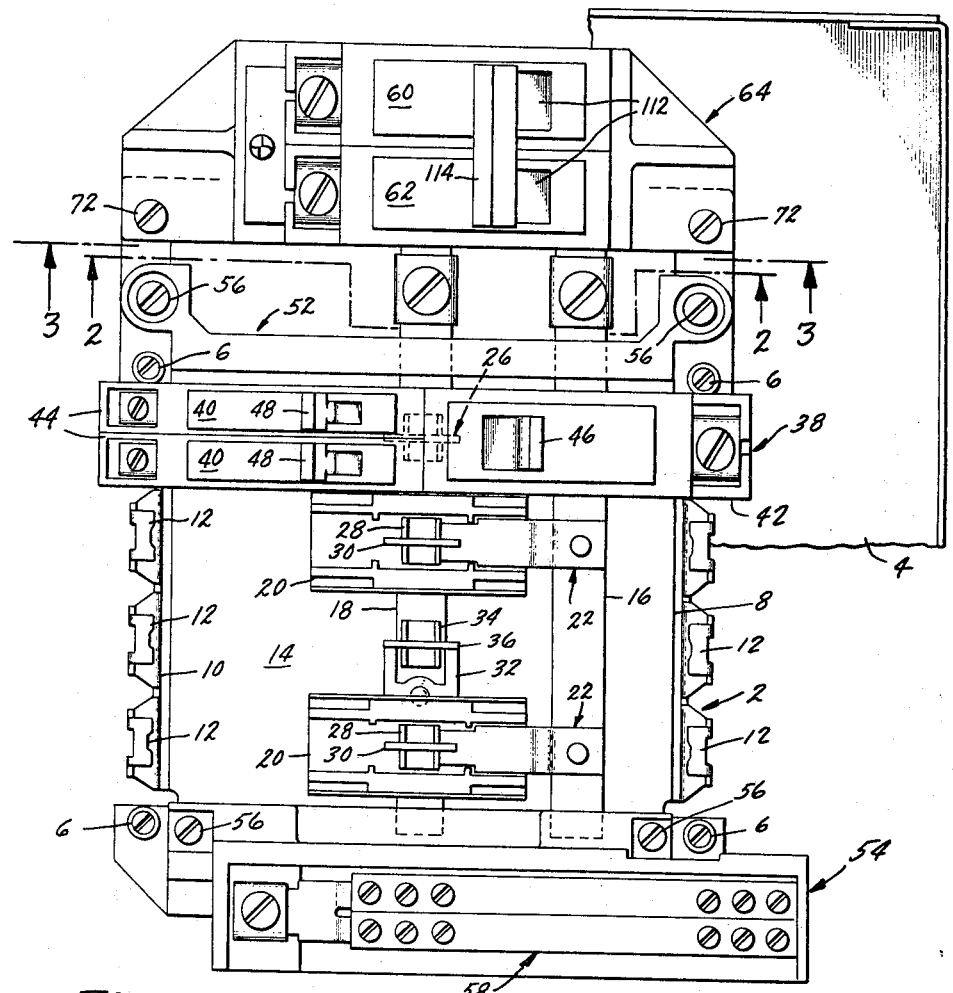
FIGURE 1 is a plan view of an electrical circuit control device panelboard assembly embodying the present invention with the main circuit control device conductor elements clamped into engagement with the connectors of the parallel conductors of the load center.

Turning now to the drawings in detail, a panelboard load center has a base or saddle generally designated by the numeral 2 and which is mounted by threaded fasteners 6 in a suitable enclosure 4 which is only fragmentarily shown. The saddle 2 has a generally planar center portion 8 and upstanding parallel side wall portions 10 each formed with a multiplicity of spaced and apertured U-shaped hook portions 12 at its upper ends.

On the center portion of the saddle 2 is a sheet of insulation 14 and two spaced busbars 16 and 18 which extends substantially parallel to the side wall portions 10. Supported on the busbar 16 is a plurality of contact arms designated by the numeral 22 which have contact portions 28, 30 secured at one end thereto and which extend in substantially perpendicular relationship to the busbar 18. In addition, the busbar 18 has a plurality of contact portions 34, 36 mounted thereon.

The contact portion 28 comprises a generally U-shaped upstanding contact blade at the end of the arm portions 22 with the legs thereof extending parallel to the busbars 16, 18. In addition, the central contact blade 30 is of greater height than the legs of the U-shaped contact blade 28 and is mounted thereon and bisects the U-shaped contact blade 28 so as to extend normally to the busbars 16, 18. The contact portion 36 has a mounting portion 32 secured to the busbar 18. The U-shaped contact blade 34 and central contact blade 36 are constructed similar to the contact portions 28, 30 described above.

Mounted on the panelboard load center are circuit breakers of two different widths designated generally by the numerals 38, 40 and having insulating casings or housings 42, 44, respectively, and operating handles 46, 48, respectively. Generally, the circuit breakers 38, 40 employ conventional construction except as pointed out hereinafter.

The smaller module circuit breakers 40 are one-half the width of the larger breakers 38 and have contact jaws (not shown) at their inner or front ends which extend normally to their longitudinal axis and thus parallel to the side wall portions 10 and the legs of the U-shaped contact blades 28, 34. At their rear ends, the breakers 40 have projecting in the longitudinal axis a pair of spaced tongues or tangs (not shown) situated adjacent the side surfaces thereof so as to provide a slot therebetween dimensioned to receive the unapertured strap portion of the hook portions 12.

The larger module circuit breakers 38 have contact jaws (not shown) at their inner or front ends which extend parallel to their longitudinal axis and thus normally to the side wall portions 10 and parallel to the central contact blades 30, 36. At their rear ends, the breakers 38 have a recess (not shown) formed in their rear surface dimensioned to receive the hook portions 12.

The busbars 16, 18 are secured to the saddle 2 by molded insulating barrier blocks 52, 54 and threaded fasteners 56. At the one end of the saddle 2 is a terminal board 58 in accordance with conventional practice.

Figure 2:
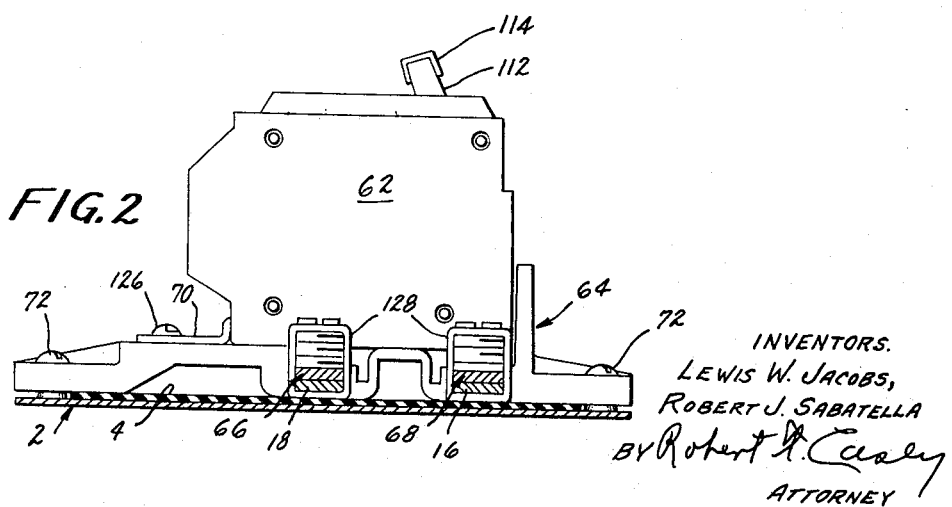
FIGURE 2 is a sectional view of the panelboard assembly along the line 2—2 of FIGURE 1.

At the other end of the saddle 2 is a main circuit breaker assembly provided by a pair of circuit breakers generally designated by the numerals 60, 62, an insulating support generally designated by the numeral 64, conductor elements on the insulating support generally designated by the numerals 66, 68, and retaining means generally designated by the numeral 70 securing the circuit breakers 60, 62 to the insulating support. The configuration of the insulating support 64 is best seen in the perspective view of FIGURE 4 and the sectional view of FIGURE 2. At either end thereof are apertures through which threaded fasteners 72 extend to secure the insulating support 64 to the saddle 2. The insulating support 64 is molded with a receptacle portion 74 in the upper surface thereof adjacent one end in which is formed an upstanding boss 76 intermediate the length thereof. A barrier wall portion 86 extends upwardly at the outer end of the receptacle portion 74.

Secured on the insulating support 64 by the fasteners 88 is the conductor element 66 which has a generally L-shaped base portion 90 and an upstanding contact blade portion 92. The length of the outer leg of the L-shaped base portion 90 is such that it projects laterally outwardly from the insulating support 64 and is downwardly offset to provide a terminal portion 94.

The conductor element 68 has a base portion 96 secured to the insulating support 64 by the fastener 98 and which is of sufficient length so as to project laterally outwardly from the insulating support 64 and provide a downwardly offset terminal portion 100. At the inner end of the base portion 96 is a contact blade portion 102 which extends upwardly in substantially parallel spaced alignment with the contact blade portion 92 of the conductor element 66. At its upper end, the contact blade portion 102 has laterally offset the edge portion 104 adjacent the barrier wall 86 to provide a shoulder 108 on one side surface.

The coupled circuit breakers 60, 62 are of generally conventional construction with molded housings 110 and operating handles 112 coupled by the connector 114. At the lower front end thereof are contact jaws 116 which are of generally inverted U-shaped configuration as best seen in FIGURE 5. Inwardly offset portions 118 are provided adjacent the free ends of the leg portions to reduce the spacing therebetween and provide enhanced clamping action. The outwardly flaring tabs 120 at the free ends provide guide surfaces for facilitating engagement upon the contact blade portions.

In order to effect engagement of the contact jaws 116 of the circuit breaker 62 upon the contact blade portion 102 of the conductor element 68, the retaining means 70 is removed and the coupled circuit breaker assembly 60, 62 is plugged onto the planar portions of the blades 92, 102. The breaker assembly is then slid longitudinally on the body of the blades 92, 102 under the offset portion 104. The retaining means 70 is then mounted in place, preventing reverse sliding movement of the breaker assembly 60, 62. The circuit breakers 60, 62 cannot be disengaged from the contact blades by pivoting about their rear edge since the contact jaw on the blade cannot open sufficiently to clear the increased width provided by the offset portion 104. Positive prohibition against sufficient expansion of the contact jaws 116 generally is provided by dimensioning of the recess in the breaker housings 110 in which the contact jaws 116 are disposed so that the ends 120 of the contact jaws 116 engage the inner side walls of the circuit breaker housing before they can spread far enough to permit clearance of the offset 104. It should be noted that the contact jaws 116 are substantially wider than the offset 104, thus requiring that they be spread a distance equal to the total overall width of the blade 102 plus the offset 104.

The circuit breakers 60, 62 are secured in engaged position by the retaining means 70 which comprises a generally plate-like member with hook-shaped portions 122 engaged in cooperatively dimensioned and configured recesses 124 in the lower rear edges of the circuit breaker housings 62, 64. The retaining means 70 is secured to the insulating support 64 by one or more threaded fasteners 126, preferably employing special socket or head designs preventing removal except by special tools possessed only by authorized persons. Generally, such threaded fasteners are known as "one-way screws."

In the illustrated assembly, the terminal portions 92, 100 of the conductor elements 66, 68 are clampingly engaged in the threaded terminal clamps 128 at the ends of the busbars 16, 18. This is conveniently effected by merely sliding the terminal portions 94, 100 into the terminal clamps 128 and then securing the insulating support 64 to the saddle 2 by the threaded fasteners 72. Alternatively, the insulating support 64 may be secured to the saddle 2 at a point spaced from the busbars 16, 18 and flexible or other conductors coupled between the terminal portions 94, 100 and terminal clamps 128 to provide the desired electrical engagement therebetween.

Thus, it can be seen that the present invention provides a novel main circuit breaker assembly which may be readily mounted in a conventional load center either in the factory or in the field with relative ease to provide a desirably safe and highly effective panelboard assembly with main circuit breaker control. The adapter base utilizes circuit breakers of generally conventional construction and may be mounted directly upon the saddle or base of the load center within the housing therefor. Although conventional circuit breaker construction is employed, inadvertent contact with the contact blades and contact jaws is substantially prevented.

While the invention has been illustrated in only one embodiment, it will be readily apparent that many modifications thereof may be made, and we therefore intend by the appended claims to cover all such modifications as fall within the true spirit and scope of the invention.

What we claim as new and desire to secure by Letters Patent of the United States is:

1. In an electrical circuit control device panelboard, the combination comprising:
   (a) a base having a generally plnaar portion;
   (b) insulating means on said base;
   (c) a pair of parallel extending conductors on said insulating means; and
   (d) a main circuit breaker assembly comprising:
      (1) a pair of electrical circuit control devices having contact jaws adjacent the lower front edge thereof extending parallel to the longitudinal axis thereof and a shoulder on the rear surface thereof;
      (2) an insulating support;
      (3) a pair of conductor elements on said insulating support electrically engaged with said pair of conductors and having upstanding parallel contact blade portions clampingly engaged by said contact jaws of said pair of control devices, one of said blade portions having an upper edge portion extending laterally from the plane of the body portion thereof to provide a shoulder and the cooperating control device having its contact jaws dimensioned and configured to permit sliding movement along the longitudinal axis thereof about said contact blade upper edge portion and into clamping engagement with said body portion below said shoulder but prevented from expansion sufficiently to permit disengagement therefrom by pivoting of the front edge of the control device upwardly about its rear edge; and
      (4) retaining means on said insulating support engaged with said shoulders on the rear surface of the control devices to prevent substantial sliding movement thereof away from said contact blade portions.

2. The panelboard of claim 1 wherein said one blade portion has an upper edge portion laterally offset to provide said laterally extending upper edge portion and wherein said contact jaws are provided by an inverted generally U-shaped member having inwardly offset leg portions adjacent the free ends thereof clamping the planar surface of said contact blade portion below said shoulder.

3. The panelboard of claim 1 wherein said conductor elements have terminal portions extending outwardly from the insulating support and providing the electrical engagement with said pair of conductors.

4. The panelboard of claim 3 wherein said terminal portions are clampingly engaged with said pair of conductors.

5. The panelboard of claim 1 wherein said insulating support has an upstanding wall extending across the front surface of said circuit control devices and preventing accidental contact with said contact jaws and contact blade portions.

6. A main circuit breaker assembly for mounting in an electrical circuit control device panelboard comprising:
   (a) a pair of electrical circuit control devices having contact jaws adjacent the lower front edge thereof extending parallel to the longitudinal axis thereof and a shoulder on the rear surface thereof;
   (b) an insulating support;
   (c) a pair of conductor elements on said insulating support adapted to be electrically engaged with a pair of conductors in the panelboard and having upstanding parallel contact blade portions clampingly engaged by said contact jaws of said pair of control devices, one of said blade portions having an upper edge portion extending laterally from the plane of the body portion thereof to provide a shoulder and the cooperating control device having its contact jaws dimensioned and configured to permit sliding movement along the longitudinal axis thereof about said contact blade upper edge portion and into clamping engagement with said body portion below said shoulder but prevented from expansion sufficiently to permit disengagement therefrom by pivoting of the front edge of the control device upwardly about its rear edge; and
   (d) retaining means on said insulating support engaged with said shoulders on the rear surface of the control devices to prevent substantial sliding movement thereof away from said contact blade portion.

7. The circuit breaker assembly of claim 6 wherein said one blade portion has an upper edge portion laterally offset to provide said laterally extending upper edge portion.

8. The circuit breaker assembly of claim 6 wherein said contact jaws are provided by an inverted generally U-shaped member having inwardly offset leg portions adjacent the free ends thereof clamping the planar surface of said contact blade portion below said shoulder.

9. The circuit breaker assembly of claim 8 wherein said contact blade portion has the upper edge portion closest to said retaining means extending in the plane of said body portion and the upper edge portion away from said remaining means deformed to provide said offset edge portion whereby the contact jaws may be slid onto said planar closest edge portion and thence under said shoulder of said offset portion.

10. The circuit breaker assembly of claim 6 wherein said conductor elements have terminal portions extending outwardly from the insulating support to provide for electrical engagement with a pair of conductors.

11. The circuit breaker assembly of claim 6 wherein said insulating support has an upstanding wall extending across the front surface of said circuit control devices and preventing accidental contact with said contact jaws and contact blade portions.

12. The circuit breaker assembly of claim 6 wherein said retaining means includes a threaded fastener releasably locking said retaining means with said shoulders of said circuit breakers, said fastener having a head portion of special configuration requiring special tools to effect rotation thereof whereby the likelihood of engagement and disengagement by unauthorized persons is minimized.

13. An adapter base for a pair of electrical circuit control devices to provide a main circuit breaker assembly for mounting in a control panelboard comprising:
   (a) an insulating support having an upstanding wall adjacent one end thereof;
   (b) a pair of conductor elements on said insulating support adapted to be electrically engaged with a pair of conductors in a panel board and having upstanding parallel contact blade portions adjacent said upstanding wall adapted to be electrically engaged by a pair of electrical circuit control devices and extending perpendicularly to said upstanding wall to permit disengagement therefrom by pivoting of the front edge of the control device upwardly about its rear edge;
   (c) retaining means on said insulating support adjacent the other end thereof adapted to engage a shoulder on the control devices to prevent substantial movement thereof away from said contact blade portions; and
   (d) means for mounting said insulating support in said panelboard.

14. The adapter base of claim 13 wherein one of said contact blade portions has an upper edge portion extending laterally from the plane of the body portion thereof to provide a shoulder adapted to receive a control device thereon having contact jaws dimensioned and configured to permit sliding movement along the longitudinal axis thereof about said contact blade upper edge portion and into clamping engagement with said body portion below said shoulder.

15. The adapter base of claim 13 wherein said contact blade portion has the edge portion closest to said retaining means extending in the same plane as the body of the contact blade portion and the edge portion away from said retaining means deformed to provide said offset edge portion whereby the contact jaws may be slid onto said planar closest edge portion and thence under said offset portion.

16. The adapted base of claim 13 wherein said conductor elements have terminal portions extending outwardly from the insulating support to provide for electrical engagement with a pair of conductors.

References Cited
UNITED STATES PATENTS 3,150,290   9/1964   Edmunds    317—119

LEWIS H. MYERS, *Primary Examiner.*

J. R. SCOTT, *Assistant Examiner.*